United States Patent
Bonardelli et al.

(10) Patent No.: US 12,260,285 B2
(45) Date of Patent: Mar. 25, 2025

(54) UNDERGROUND, SUB-SURFACE AND SURFACE MONITORING TECHNOLOGY AND ASYNCHRONOUS DISTRIBUTED SYSTEM

(71) Applicant: NESTING SAFE INC., Montreal (CA)

(72) Inventors: John C. Bonardelli, Montreal (CA); Marc-André Larin, Montreal (CA)

(*) Notice: Subject to any disclaimer, the term of this patent is extended or adjusted under 35 U.S.C. 154(b) by 0 days.

(21) Appl. No.: 18/280,726

(22) PCT Filed: Mar. 10, 2022

(86) PCT No.: PCT/CA2022/050350
§ 371 (c)(1),
(2) Date: Sep. 7, 2023

(87) PCT Pub. No.: WO2022/187960
PCT Pub. Date: Sep. 15, 2022

(65) Prior Publication Data
US 2024/0303448 A1 Sep. 12, 2024

Related U.S. Application Data

(60) Provisional application No. 63/159,192, filed on Mar. 10, 2021.

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .............. G06K 7/10366; G06K 19/0723
USPC ...................................................... 235/451
See application file for complete search history.

(56) References Cited

U.S. PATENT DOCUMENTS

2018/0262571 A1* 9/2018 Akhtar ............... A01G 25/16
2020/0204944 A1    6/2020 Realmfive

FOREIGN PATENT DOCUMENTS

WO       2020198727 A1   10/2020

* cited by examiner

Primary Examiner — Toan C Ly
(74) Attorney, Agent, or Firm — FRANCE COTE

(57) ABSTRACT

A data collection system able to provide in real-time sensor data and asynchronous sensor data is described. The data collection system comprises at least one tag device comprising a battery, a memory, a transceiver, a controller, and at least one sensor. The tag device being adapted for generating and transmitting a beacon signal at first intervals; and for storing the data in memory when no reception signal is received within a first time lapse. The data collection system comprises a bridge device comprising a controller and a transceiver. The bridge device being adapted for receiving, tether-free from the at least one tag device, the beacon signal; and transmitting the reception signal in response to the beacon signal. The tag device is also adapted to transmit asynchronous signals when the beacon signal is received.

20 Claims, 4 Drawing Sheets

UNDERGROUND, SUB-SURFACE AND SURFACE MONITORING TECHNOLOGY AND ASYNCHRONOUS DISTRIBUTED SYSTEM

CROSS-REFERENCE TO RELATED APPLICATION

This application claims priority from U.S. provisional patent application No. 63/159,192 filed Mar. 10, 2021, the specification of which is hereby incorporated herein by reference in its entirety.

BACKGROUND

(a) Field

The subject matter disclosed generally relates to monitoring systems and methods for performing and communicating measurements. More particularly, the subject matter disclosed relates to systems comprising underground sensors, sub-surface use of sensors and/or above ground use of surface sensors for performing measurements that are adapted for low maintenance and no-tethering operations.

(b) Related Prior Art

Underground wireless sensor systems constitute one of the promising application areas where the main focus is on the use of sensors at the subsurface region of the soil. In the past, sensors have been buried underground, typically targeting irrigation and environmental monitoring applications. However, these sensors did not have full wireless communication capability. In other words, they used sensors connected to a communication node that wirelessly transmit information. Hence, wireless monitoring systems have been developed with the promise of filling this gap and to provide the infrastructure for novel applications.

An important difference between underground wireless systems and terrestrial wireless systems is the communication medium (soil vs. air). In fact, the differences between the propagation of electromagnetic (EM) waves in soil and in air are so significant that a complete characterization of the underground wireless channel was only available recently.

Terrestrial wireless systems present their own challenges. Moisture and air conductivity vary overtime depending on weather changes and stimuli such as water content, salinity, and moisture. Another challenge resides in the presence of physical obstructions that may attenuate or prevent transmission of data, with such obstruction sometimes being variable in time, like growing vegetation.

This difference is even more significant when the large spectrum of inherent soil characteristics affecting electromagnetic propagation is taken into account. More specifically, the changes in temperature, weather, soil moisture, soil composition, and depth directly impact the connectivity and communication success in underground settings. Monitoring changes in soil conditions over time is an important part of many research activities geared to understanding soil processes and their implications on agriculture and other natural resource systems. Numerous new technical solutions provide reliable capability to transmit soil sensor data wirelessly, which facilitate remote monitoring of measured parameters in real time. However, they require components to be wired, and wired connections between sensors/transducers installed below the soil surface and data transmission modules are required, and this may affect the measured parameters.

Despite some potential advantages, the realization of underground wireless sensor systems is challenging, and several open research problems exist.

One challenge is the realization of efficient and reliable underground and/or terrestrial wireless communication between buried sensors and/or sensors located in difficult accessible areas, such as a vast commercial farmland and/or wildland, coastal habitats, dense vegetation and natural forests. Such underground wireless systems typically include nodes, which function both as sender and receiver, which are usually above ground. For example, nodes in such systems may be wirelessly coupled in a "mesh network" and may be used to monitor gas lines and relay the monitored data for processing. Nodes in such a system are usually tasked with collecting "event-type" data. For example, in a case where some threshold event occurs near one of the nodes, the node will detect the event and will transmit a signal indicative of that event through the mesh network.

Another challenge of the known solutions resides in the realization of a precisely locatable underground wireless sensor system. Such systems are particularly desirable in situations where the receiver node is carried by the operator aboveground in an attempt to (i) locate a buried sender node and (ii) collect data from the sender node.

Another challenge is the maintenance. Maintenance or replacement of underground sensors both greatly affects the environment in which they operate, and presents substantial costs.

The systems in place today are also not normally made to optimize power use, communication distance and/or communication efficiency.

Hence, there is a need for an efficient and reliable system and method for collecting data without the use of tethers or other physical connections between the monitoring device(s) and a data analytic device, wherein the monitoring device(s) is(are) adapted for underground, near surface, ground interface, and surface measurements such as temperature, humidity, vibration, CO2, level or quantity of liquid or gas, moisture, salinity, nutrient rates and other environment/weather information in a given environment.

There is also a need for an efficient and reliable system and method that operates in different conditions, and particularly in relation with soil moisture, vegetation growth, air humidity and other variable conditions changing over time and seasons.

There is also a need for data collection components being able to collect data substantially below the ground interface, e.g., below 60 cm from the ground surface, to provide additional data not available nowadays, and remain operational regardless of common ground work associated with e.g., sowing, plowing.

The present invention therefore seeks to overcome the drawbacks of the prior art.

SUMMARY

In some aspects, the techniques described herein relate to a data collecting system including: at least one tag device including a battery, a memory, a transceiver, a controller, and at least one sensor, the tag device being adapted for: generating and transmitting a beacon signal; storing the data in memory when no reception signal is received within a first time lapse; and entering an idle mode for a second time lapse during which the at least one tag device is unable to detect signals; and a bridge device including a controller and a transceiver, the bridge device being adapted for: receiving, tether-free from the at least one tag device, the beacon signal; and transmitting the reception signal in response to the beacon signal.

In some aspects, the techniques described herein relate to a data collection system, wherein the beacon signal includes data relative to a reading performed by the at least one sensor.

In some aspects, the techniques described herein relate to a data collection system, wherein the at least one tag device is adapted to operate in a low-power mode during the second time lapse, and in at least one active mode consuming more power than the low-power mode, wherein the at least one tag is adapted to exit the low-power mode at the first intervals for the at least one sensor perform a reading.

In some aspects, the techniques described herein relate to a data collection system, at least one active mode includes a data transmission mode, a data reception mode and a memory updating mode.

In some aspects, the techniques described herein relate to a data collection system, wherein the at least one tag device is adapted for transmitting a follow-up signal including asynchronous data upon reception of a reception signal.

In some aspects, the techniques described herein relate to a data collection system, wherein the at least one tag device is adapted to receive a reception signal following transmitting the follow-up signal within a second time lapse, and to optionally erase the asynchronous data from the memory.

In some aspects, the techniques described herein relate to a data collection system, wherein power ratio of the at least one active mode over the low-power mode is at least 50:1.

In some aspects, the techniques described herein relate to a data collection system, wherein the transceiver of the at least one tag device is adapted for exchanging signals of a wavelength of less of 1 GHz.

In some aspects, the techniques described herein relate to a data collection system, wherein the transceiver of the at least of tag is adapted for exchanging signals using one selected wavelength among a plurality of wavelengths.

In some aspects, the techniques described herein relate to a data collection system, wherein a ratio of the second time lapse over the first time lapse is at least 50:1.

In some aspects, the techniques described herein relate to a data collection system, wherein a ratio of the second time lapse over the first time lapse is at least 300:1.

In some aspects, the techniques described herein relate to a data collection system, wherein the at least one sensor is an underground sensor.

In some aspects, the techniques described herein relate to a data collection system, wherein the at least one sensor is a ground interface sensor.

In some aspects, the techniques described herein relate to a data collection system, wherein the at least one sensor is a surface sensor.

In some aspects, the techniques described herein relate to a data collection system, wherein the at least one tag device includes a first tag device and a second tag device transmitting beacon signals independently from each other.

In some aspects, the techniques described herein relate to a data collection system, wherein the first tag device operates according to a first set of parameters, and the second tag device operates according to a second set of parameters, and the first set of parameters is not identical to the second set of parameters.

In some aspects, the techniques described herein relate to a collection and analytic system, including the data collection system, and at least one aggregator adapted for receiving the data and to validate, analyze and/or modify the data.

In some aspects, the techniques described herein relate to a method of operating a tag device of a data collecting system, the tag device including a memory and at least one sensor, the method including: generating and transmitting a beacon signal, the beacon signal including data relative to a reading performed by the at least one sensor; upon no reception signal is received within a first time lapse following transmitting the beacon signal, storing the data in memory; and entering an idle mode for a second time lapse during which the at least one tag device is unable to detect signals.

In some aspects, the techniques described herein relate to a method, further including to transmit a follow-up signal including asynchronous data upon reception of a reception signal.

In some aspects, the techniques described herein relate to a method, further including to receive a reception signal following the transmission of the follow-up signal within a second time lapse, and to optionally erase the asynchronous data from the memory.

In some aspects, the techniques described herein relate to a method, including setting a ratio of the second time lapse over the first time lapse to at least 50:1.

In some aspects, the techniques described herein relate to a method, including setting a ratio of the second time lapse over the first time lapse is at least 300:1.

In some aspects, the techniques described herein relate to a method, including placing the tag in a location being one of underground and in foliage.

In some aspects, the techniques described herein relate to a method, further including keeping the tag.

In some aspects, the techniques described herein relate to a method, including modifying transmission power of the tag device once in the location.

In some aspects, the techniques described herein relate to a method, including modifying duration of the first interval of the tag device once in location.

In some aspects, the techniques described herein relate to a method, including selecting a communication wavelength for the tag device once in location.

According to an aspect, the present solution is directed to a wireless system where underground, sub-surface and/or surface sensors are designed for being located by an aboveground receiver for data collection. Underground, sub-surface and/or surface sensors are configured to gather "temporal-type" (time series) data about the immediate environment in which they are buried or located, for example temperature, humidity, vibration, $CO_2$, level or quantity of liquid or gas, moisture, salinity, nutrient rates and other environment/weather information and for transmitting data to the receivers asynchronously. Without limiting the application of such a system, one application of such a system is collecting environmental data throughout time and in proximity to respective wild and/or domestic animal nests, such as reptile and bird nests and mammalian borrows. Another application of such a system is collecting data in farmland, wild land, coastal habitats, dense vegetation and natural forests. Another application of such a system is collecting data through obstacles such as roadways, buildings and thick layers of concrete walls. Hence, if the position of the sensor is known, an operator located within an acceptable range from the sensor can approach it with the aboveground receiver and the monitored temporal-type data can thus be transferred.

In a sense, the present system solves a "needle in a haystack" problem by avoiding at least partially to locate and/or retrieve an underground, sub-surface and/or surface sensor, e.g., sender or "tag", so that an operator with an aboveground receiver can collect data from the sensor without the need of knowing precisely its location. For example, by knowing the location of the sensors at a precision of, e.g., from within 20 to 90 meter radius.

According to embodiments, there is provided a system comprising at least one sensor having a known geo-tag, the at least one sensor adapted for: collecting temporal-type data from an environment; storing the collected temporal-type data; and emitting periodic wireless beacon signals, wherein the at least one sensor is capable of adapting to the temporal-type data collected from the environment, thereby adjusting its collection and storage of temporal-type data capabilities and its emitting capabilities; and an aboveground high gain antenna communicatively coupled with a signal processing device comprising memory, wherein the signal processing device is adapted to operate, through the high-gain antenna, operations of: detecting the beacon signal emitted by the at least one sensor; establishing a bidirectional communication with the at least one sensor; and receiving data signals from the at least one sensor through which the temporal-type data is transmitted from the at least one sensor to the signal processing device, wherein the system is able to associate geo-tags with the collected temporal-type data without geo-localization of the at least one sensor.

The at least one sensor may be an underground sensor.
The at least one sensor may be sub-surface sensor.
The at least one sensor may be a surface sensor.
The signal processing device may comprise: means for receiving a data signal from a foreign-type device; means for extracting data from the data signal; means for generating a geo-tag based on a current location of the signal processing device; and means for associating the geo-tag with the extracted data.

The system may comprise at least one aggregator adapted to receive the gathered temporal-type data and to validate, expand, and/or modify the gathered temporal-type data.

The system may comprise multiple underground sensors, sub-surface (aka near ground interface) sensors and/or surface (aka ground interface and above ground) sensors, and a communication bridge in wireless communication with the multiple underground sensors, sub-surface sensors and/or surface sensors.

The measuring parameters and fine tuning settings of the sensors may be changed and programmed wirelessly.

According to another embodiment, there is provided a method for collecting temporal-type data from its environment, comprising a system comprising: at least one sensor having a known geo-tag, the at least one sensor adapted for: collecting temporal-type data from an environment; storing the collected temporal-type data; and emitting periodic wireless beacon signals, wherein the at least one sensor is capable of adapting to the temporal-type data collected from the environment, thereby adjusting its collection and storage of temporal-type data capabilities and its emitting capabilities; an aboveground high gain antenna communicatively coupled with a signal processing device comprising memory, wherein the signal processing device is adapted to operate, through the high-gain antenna, operations of: detecting the beacon signal emitted by the at least one sensor; establishing a bidirectional communication with the at least one sensor; and receiving data signals from the at least one sensor through which the temporal-type data is transmitted from the at least one sensor to the signal processing device, wherein the system is able to associate geo-tags with the collected temporal-type data without geo-localization of the at least one sensor; at least one aggregator adapted to receive the gathered temporal-type data and to validate, expand, and/or modify the gathered temporal-type data; a database server maintaining a database for storing the temporal-type data; and a communication bridge in wireless communication with the underground sensor, sub-surface sensor and/or surface sensor.

Therefore, it is an objective to provide a tether-free data collection system that allows the transmission of sensor data through the soil, which will reduce sensor-induced soil distortion and, therefore, provide more unbiased sensor data. This technology provides a solution to monitor soil moisture content and temperature, data required for modeling agro-ecosystem processes. This technology also provides a solution to observe soil processes during freezing/thawing cycles, heavy rains, precipitation, thus a year-around solution.

Features and advantages of the subject matter hereof will become more apparent in light of the following detailed description of selected embodiments, as illustrated in the accompanying figures. As it will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
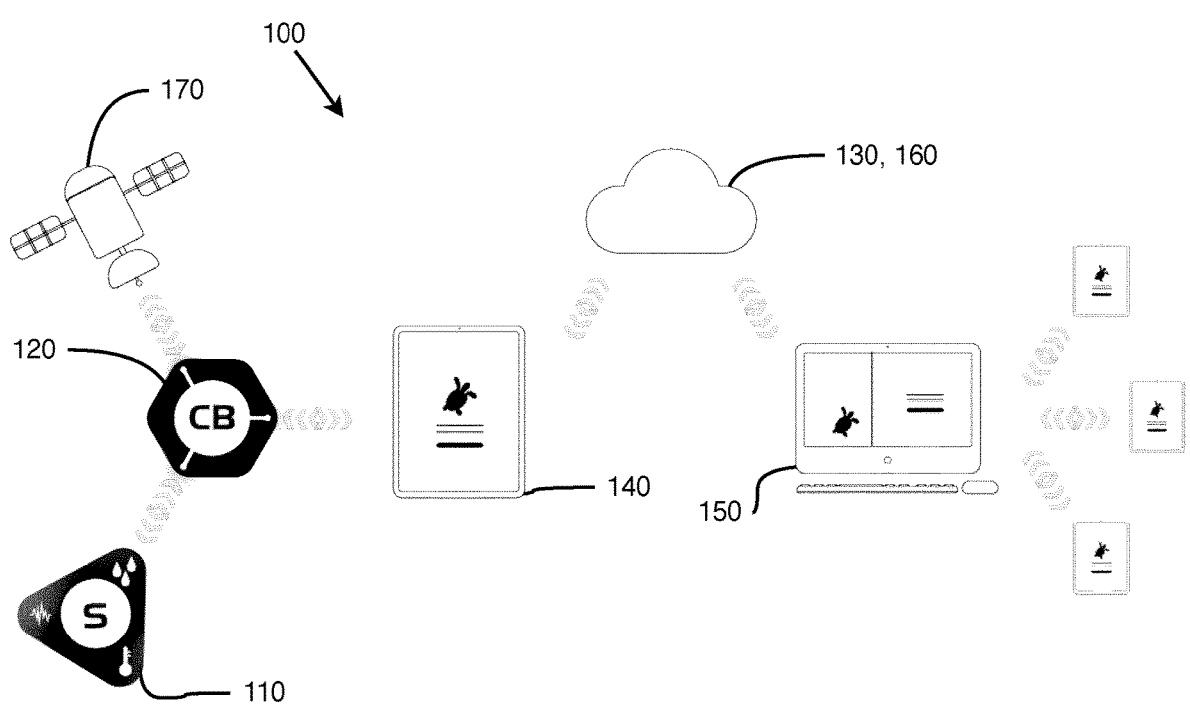
FIG. 1 is a schema of the system in accordance with an embodiment.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product.

As used herein, the term "comprising" is intended to mean that the list of elements following the word "comprising" are required or mandatory but that other elements are optional and may or may not be present. As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or method steps.

It should further be noted that for purposes of this disclosure, the term "connected" means the joining of two members directly or indirectly through communication of signals between the two members, either unidirectionally or bidirectionally, unless specified. "Tether-free" refers to a connection between components that is free of any physical connection linking the components, permanent or releasable.

"Tag device" herein refers to a device comprising at least one sensor and designed to autonomously collect sensor data and to transmit the collected sensor data in real time or asynchronously for data analytics.

"Bridge device" herein refers to a device able to enter communication, aka receive and transmit signals, with a tag device for data collection. The bridge device, according to embodiments, may be adapted for complementary operations, such as aggregation, validation, and analysis of data.

"Temporal-type data", "sensor data", "sensor read data" and "monitoring data" herein refer to data read from a potentially evolving environment, wherein time stamp may be associated with the data and data sequence may be evaluated for obtaining a picture over time of the state changes over time. Non-limiting examples of such states are temperature, humidity, and CO2 level.

"Near-surface" refers to close to the surface, at the surface interface of the ground and the air, lying at the surface It is worth to mention that given the difficulty of reaching a tag device once in place in some operating locations, such as when used underground, a characteristic of the system allowing to minimize the physical maintenance operation (such as changing a battery) is a capability to maximize power use, while being efficient at communicating within a long distance. Another characteristic that participates in decreasing maintenance costs being that the tag devices being tether-free programmable and accordingly its operating parameters being adjustable through tether-free communication.

Referring now to the drawings, and more particularly to FIG. 1, the data collecting system 100 is adapted to provide asynchronous data collection, aggregation, transmission and analysis of, e.g., underground collected data, sub-surface area collected data, or surface collected data.

The data collecting system 100 comprises one or more tag devices 110 comprising one or more sensors, e.g., underground sensors, near-surface sensors and/or above ground surface sensors. The data collecting system 100 further comprises a bridge device 120 in communication with the tag device 110.

According to a more global perspective, a Data Collection and Analytic system, aka DCA system 105 further comprises a database server 130, for example a cloud server 160, with a bridge device 120 being in communication with the database server 130 and/or the cloud server 160.

According to realizations, the DCA system 105 further comprises at least one aggregator 140, which may communicate with the bridge device 120. The aggregator 140 is adapted for aggregating and storing data transmitted by the bridge device 120. The aggregator 140 may be of any type of signal processing device, e.g., a tablet, and/or a web dashboard 150 operable through e.g., a computer or mobile device, comprising memory where aggregated data is collected by and received from the bridge device 120.

The data collecting system 100 is adapted to use geolocalization technology involving the support of one or more satellite(s) 170. The one or more satellite(s) 170 and the aggregator 140 are exchanging data either directly through the aggregator 140 or through the bridge device 120 allowing to geo-localize the tag devices 110, and the aggregator 140.

Figure 2:
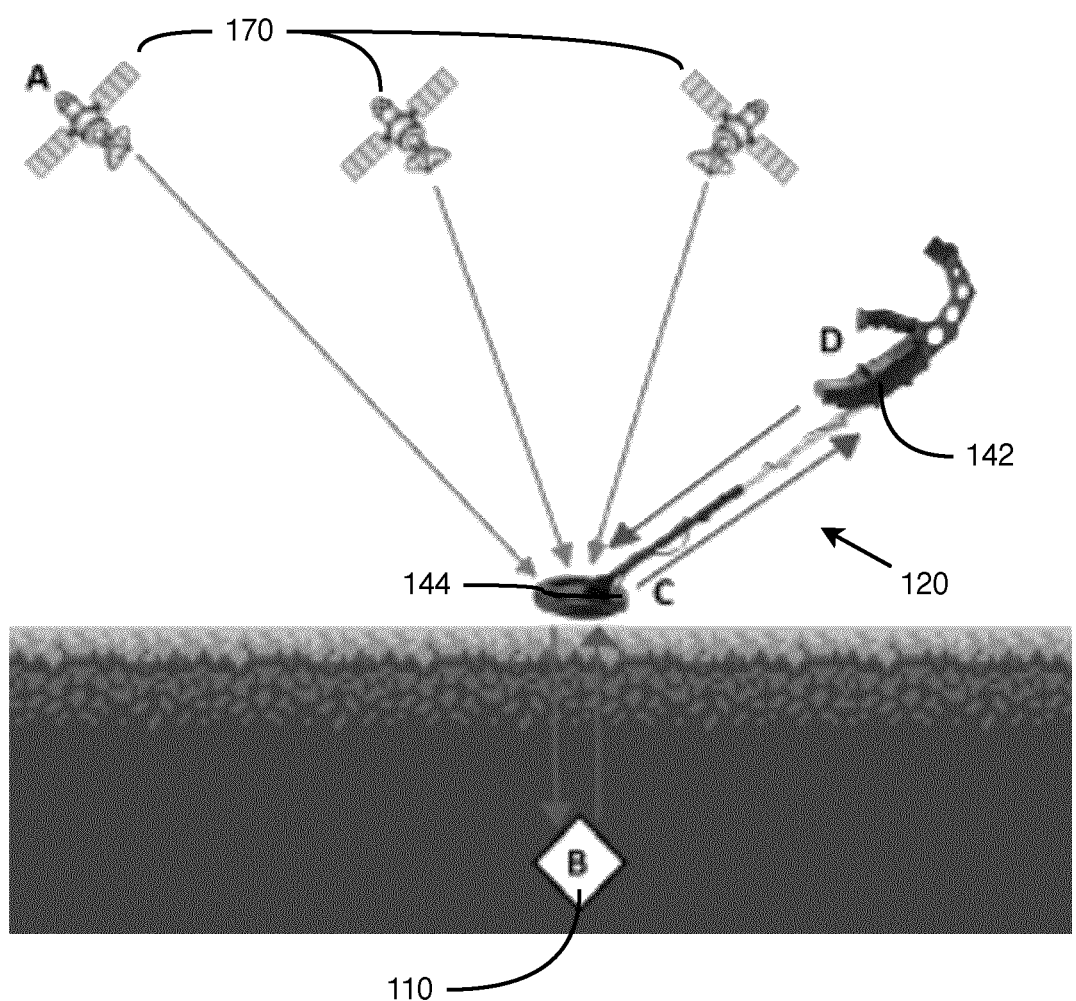
FIG. 2 is a schema of components involved in the collection of data using an antenna in accordance with another embodiment.

Referring additionally to FIG. 2, according to an embodiment the bridge device 120 comprises a processing device 142 adapted to exchange, tether-free data with tag devices 110 through a high gain antenna 144.

The tag devices 110 are adapted to be operable in tether-free conditions, such as buried underground, and able to exchange data with the bridge device 120, comprising sensor-collected data, over a substantial maintenance-free period. The tag devices 110 are adapted to collect environmental data, such as temporal-type data (e.g., temperature, humidity, vibration, level or quantity of liquid or gas, etc.) above and below the ground. The tag devices 110 are adapted to communicate wirelessly with the bridge device 120 according to a proprietary protocol, whereby the tag device 110 operates in tether-free conditions.

The tag device 110 may also be adapted to be operable on a near-surface area and able to transmit data to the bridge device 120. The tag device 110 is adapted to collect environmental data, such as temporal-type data (e.g., temperature, humidity, vibration, CO2, level or quantity of liquid or gas, etc.) above and below the ground. The tag devices 110 are adapted to communicate wirelessly with the bridge device 120 according to a proprietary protocol, whereby the tag devices 110 operate in tether-free conditions.

The tag device 110 may also be adapted to be operable on a surface area and able to transmit data to the bridge device 120. The tag devices 110 are adapted to collect environmental data, such as temporal-type data (e.g., temperature, humidity, vibration, $CO_2$, level or quantity of liquid or gas, etc.) resulting from the monitoring of their environment, e.g., underground temperature. The tag devices 110 are adapted to communicate wirelessly with the bridge device 120 according to a proprietary protocol, whereby the tag devices 110 and bridge device 120 operate in tether-free condition relative to each other.

According to an exemplary realization, the tag devices 110 are adapted to be geo-located, e.g., associated to a geo-tag, at the time they are buried. Once buried, the tag devices 110 are adapted to collect temporal-type data from the environment they monitor and to provide the data for analytics.

Accordingly, the tag devices 110 are adapted to transmit according to a power-management operating protocol, the data to the bridge device 120.

Figure 3:
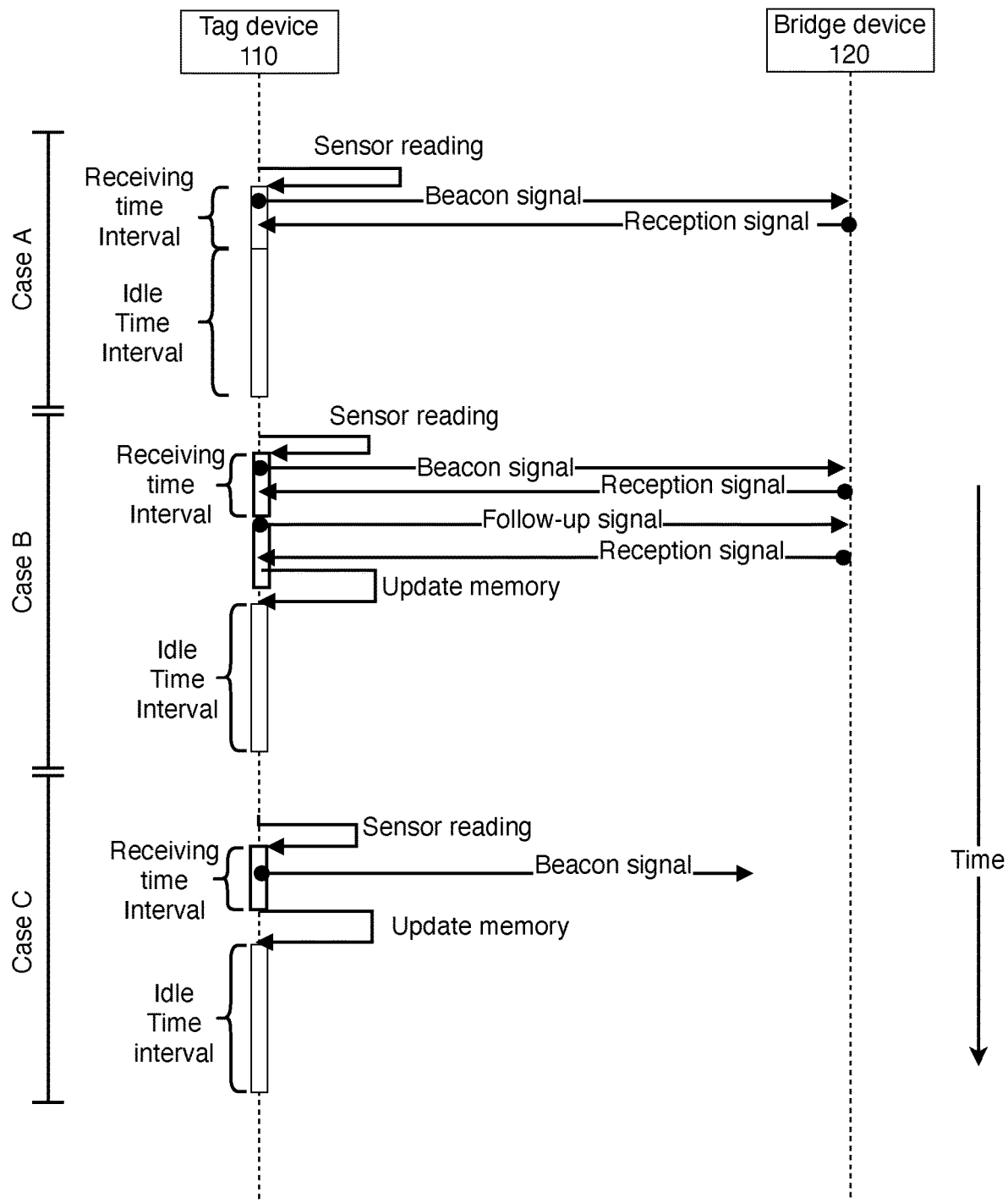
FIG. 3 is a representation of tether-free communication conditions between a tag device and the bridge device 120 in accordance with an embodiment.

Referring to FIG. 3, Illustrated in Case A, tag devices 110 periodically exit a low-power operating condition, aka idle state, to collect environmental data and transmit a wireless beacon signal comprising the data. During a short period after having sent the beacon signal, the tag device 110 enters a reception mode for a short receiving period, e.g., between 0, 5 and 2 seconds. If a data reception signal is received from the bridge device 120 during the receiving period, the tag device 110 returns in idle state until the data collection interval, e.g., typically between 5 and 15 minutes, ends.

Illustrated in Case C, tag devices 110 transmit a wireless beacon signal comprising the data. During the short period in a reception mode, if a data reception signal is not received from the bridge device 120, the tag device 110 stores the sensor data (e.g., time and sensor data) in memory and returns in idle state.

Illustrated in Case B, according to a realization, when asynchronous sensor data is stored in the memory of the tag device 110, after reception of the data reception signal from the bridge device 120, the tag device 110 sends a follow-up signal, a stored data signal comprising the asynchronous stored sensor data. When receiving a second data reception signal from the bridge device 120, the tag device 110 erases the asynchronous sensor data from memory and returns in the idle state.

In some embodiments, asynchronous data may be stored and marked in memory as communicated. When recovering the tag device 100, memory data may be analyzed, comprising sensor readings.

Accordingly, the power consumption of the tag device 110 associated with environmental monitoring is kept minimal. Further, data may be analyzed both synchronously (if the bridge device 120 is in condition to receive all beacon signals), and asynchronously (if at the time data is received by the bridge device 120 the data comprises sensor data stored in the memory of the tag device 110).

Therethrough, two-way tether-free communication can be initiated between the tag device 110 and the bridge device 120 for sensor data exchange.

According to an embodiment, the two-way tether-free communication is used to program and/or change parameters, aka fine tune settings of the tag device 110.

According to an embodiment, the bridge device 120 is adapted to receive and interpret signals from a Global Navigation Satellite System (GNSS) and to perform Real-Time Kinematic positioning (RTK geo-positioning).

In an embodiment, the aggregator 140 is built in, e.g., an Android tablet or other data management mobile device of similar capabilities. The at least one aggregator 140 allows users to manually associate data coming from tag devices 110. The at least one aggregator 140 is able to exchange data with the Cloud, e.g., a cloud server 160, for asynchronous synchronization of the aggregator-modified data with a database hosted on the cloud server 160.

According to an embodiment, the aggregator 140 is able to collect data from other, tethered or tether-free, data-collecting device(s) (not depicted), e.g., foreign-type device such as a vernier, a caliper, a weigh scale, or measuring devices, wherein the data-collecting device(s) may be connected to the aggregator 140 either wirelessly, or through a wireless technology such as Wi-Fi, Bluetooth and radio frequency or physically connected permanently or ad hoc. The aggregator 140 is adapted to associate a geo-tag to the received data. For example, the geo-tag of the data transmitted by the device connected to the aggregator 140 may be defined based on determination of the current location of the aggregator 140 or preset known geo-location of the device established when installed.

According to a realization, the aggregator 140 is adapted to display information on its screen, for example the geo-location of the tag devices 110 and/or data collected from sensors embedded in the tag devices 110. The aggregator 140 provides means to enter data in the database and to validate state and functions of the tag devices 110 without having the tag devices 110 to be withdrawn from their operating location, e.g., the tag device 110 being dug out from the ground, physically accessing the sub-surface or the surface area to collect the tag device 110, breaking a structure in which the tag device 110 is set.

For its part, the web dashboard 150 allows a user to visualize, validate and/or analyze data collected and transmitted with the aggregator 140. For example, a database server 130 may store data, with the aggregator 140 and the web dashboard 150 being able to retrieve data from the database server 130, visualize, modify and/or expend the data retrieved from the database server 130, and send the modified and/or expended data to the database server 130 whereby the data can be (asynchronously) accessed, modified, expended, analyzed, reported, etc.

Accordingly, the aggregator 140 and the web dashboard 150 are meant to interact with the data collected on the aggregator and from the tag devices 110.

The tag devices 110 of the data collecting system 100 are adapted to be configured wirelessly, tether-free, on demand as discussed before. More precisely, the data collecting system 100, and more generally the DCA system 105, is designed to allow modifying monitoring parameters and communication parameters of the tag devices 110 according to the information parameters useful to the user and according to the environment characteristics in which the tag devices 110 are installed.

Practically, a tag device 110 transmits beacon signals periodically. Once the beacon signal is responded to, and a two-way tether-free communication is initiated between the tag device 110 and the bridge device 120, the communication may comprise, additionally to sensor data, configuration data such as internal-clock time-setting, beacon and data collection frequency settings, datatype collection activation or deactivation, signal generation settings (communication frequency, wavelengths, power, etc.), measuring parameters, etc.

Therefore, the data collecting system 100 allows to customize the data collection configuration without having to access or withdraw, e.g., dig out or physically retrieve, the tag device 110 from their locations and to adapt them to a specific use, as long as no sensor modification is required.

Figure 4:
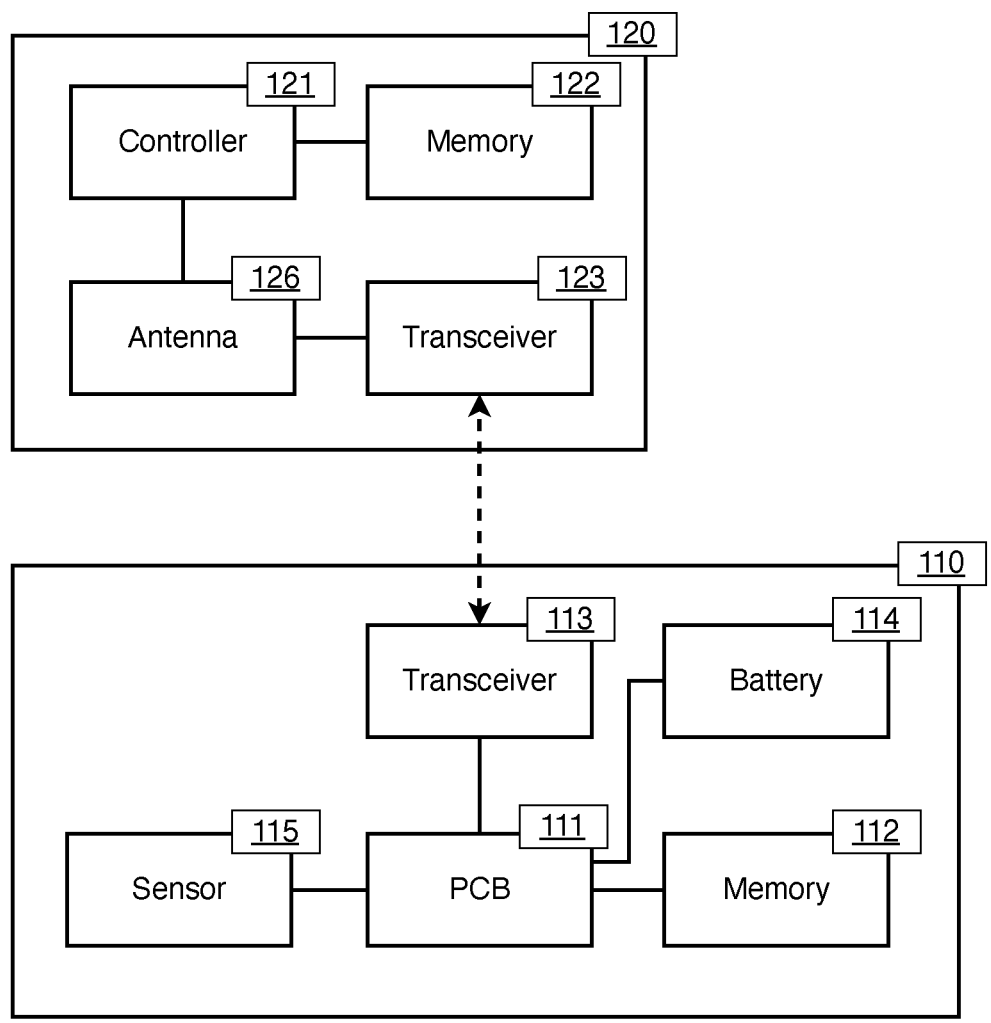
FIG. 4 is a clock diagram illustrating components of a DCA system comprising a tag device and a bridge device in accordance with an embodiment.

Referring particularly to FIGS. 2 and 4, the bridge device 120 may comprise a mobile device 142 connected to a high gain antenna 144. The mobile device 142 may provide a user interface that is adapted to display information that allows an operator to retrieve information from one or more tag devices 110. According to embodiments, the mobile device 142, once a two-way communication is initiated with a tag device 110, may display information on the signal exchanged with the tag device 110, comprising, for example, signal data and/or computed data relative to the signal (e.g., characteristics of the signal, power of the signal, frequency on which the signal is sent, data protocol, etc.), the relative distance between the tag device 110 and the bridge device 120, identification of the tag device 110 and other sensor-specific data, and information on the data collected by the one or more tag device 110 and transmitted asynchronously to the mobile device 142. For the establishing communication with buried tag devices 110, the high gain antenna 144 is pointed towards the ground. Once the high gain antenna 144 is within a desired distance from a tag device 110 (e.g., within a communication enabling radius of between 20 and 90 meters), upon a beacon signal communicated by the tag device 110, a two-way tether-free communication is set between the devices. Through the two-way communication, data/information/signal is exchanged through the high gain antenna 144 and transmitted to the mobile device 142 of the operator. The tag device 110 can provide various types of data, such as measurement parameters such as temperature, humidity, etc. One of ordinary skills in the art would appreciate that the nature of the data varies with nature and the capabilities of sensors 115 of the tag device 110, and the nature of which monitoring means have been activated since the tag devices 110 are highly polyvalent and a large variety of sensors 115 can be retrofitted or installed into a tag device 110 for a task-specific data collection required by a user.

As illustrated on FIG. 4, according to an embodiment the tag device 110 comprises a Printed Circuit Board (PCB 111), a battery 114 powering the PCB 111, a memory 112 mounted to the PCB 111 adapted to store program code, data, parameters, etc., at least one sensor 115, and a transceiver 113 adapted to transmit and receive data.

According to an embodiment, the bridge device 120 comprises a controller 121 on which is connected memory 122, an antenna 126 and a transceiver 123. According to a realization, the antenna and transceiver may be embodied as communication means.

It is worth mentioning that tag devices 110 may comprise a combination of active components and passive components, an example of the latter is a RFID tag detectable without being powered.

According to an embodiment, tag devices 110 are adapted to operate in sub-GHz bandwidth for tether-free communication with the bridge device 120. According to an embodiment, the tag devices 110 are adapted for tether-free communication any of a plurality of available frequency bands. In an embodiment using a Printer Control Board (hereafter called PCB 111) with an ultra-low power high performance, sub-1 GHz transceiver, S2-LP Transceiver™ from ST Lite.augmented™, capable of operating with any one of the frequency bands at 433, 512, 868 and 920 MHz. According to an embodiment, the transceiver 123 operates in any one of the frequency ranges of 413-479 MHZ, 452-527 MHZ, 826-958 MHz and 904-1055 MHz.

According to an embodiment of a tag device 110, ratio power for operating in an active mode (aka a signal transmission mode, a signal receiving mode or listening mode, a memory update mode, aka process of storing data in the memory and process of data erasing data in the memory) over a low-power mode, aka idle mode, is at least 50:1, and preferably 100:1, and preferably at least 1000:1, and according to embodiment over 10000:1. By combining high-value ratios of idle mode time over active mode time and active mode power over idle mode power, life expectancy of the tag devices are greatly improved.

According to embodiments, tag devices 110 are designed to be modular. Tag devices 110 comprise a communication module comprising the tether-free communication related components, and at least one data collection module, connected to the communication module, comprising one or more sensor 115. Preferably, the connection between the communication module and the data collection module provides an enclosure isolating non-sensory components from the environment in which the tag device 110 is located.

According to an embodiment, the tag devices 110 are adapted to be buried in the ground, either under vegetation or not. According to a realization, the tag devices 110 may be buried down to at least 20 cm, at least 40 cm, at least 60 cm, at least 80 cm and even 100 cm from the ground surface while being able to enter tether-free communication with the bridge device 120.

According to an embodiment, the tag devices 110 when buried in the ground (in the sand buried at least 60 cm deep, and more preferably at least 100 cm deep, and are detectable above ground by the bridge device 120 when the bridge device 120 is at a distance of at least 20 meters, at least 40 meters, at least 60 meters and even up to 80 meters from the vertical of the tag device 110.

According to an embodiment, the tag devices 110 are operable, in other words able to perform and communicate measurements, without maintenance with a battery of selected based on the nature of the sensor up to at least 1 year, at least 2 years and up to at least 3 years without the battery being depleted under a level preventing the operation of the tag device 110.

According to an embodiment, tag devices 110 may be located in a variety of locations, comprising e.g., a mix of underground tag devices and above ground tag devices communicating with the same bridge device 120. The operating parameters, including the signal transmission intervals may differ from one tag device to another without disrupting the capacity of the data collection system 100 to operate.

It is worth mentioning that the present data collection system 100 based on the instant signaling of the read data and parametric intervals of asynchronous data, allows clocks of devices 110, 120 to not be in sync without disturbing its operation. By regression, the bridge device 120 is able to associate timestamps on any asynchronous data based on known time reading of the synchronous reading communicated in the beacon signal. Therefore, the present solution avoids problems known to interfere with the operation of common node networks, including consumption of power associated with maintaining node clocks synchronization.

It is worth mentioning that the data collecting system CDA 100 can be used in a variety of contexts, such as for example, in a scientific context where data can be gathered for research purposes from wild and/or domestic animals' nests, such as reptile and bird nests and mammalian borrows and geo-physical applications. Another application of such a data collecting system 100 is collecting data from farmland, wild land, coastal habitats, dense vegetation, and natural forests for industrial and research purposes. Another application of such a data collecting system 100 is collecting data through obstacles such as roadways, buildings, and thick layers of concrete walls.

It is therefore herein contemplated that, according to contexts, tag devices 110 may be buried underground, tag devices 110 may be placed above ground, and according to the needs of the user the data collecting system 100 may comprise a mix of multiple tag devices 110 buried underground, tag device 110 placed on subsurface locations, and/or tag devices 110 placed above ground. Mix of parameters (intervals, communication wavelengths, signal power, etc.) may also vary between devices, and changed as needed based on changes in conditions (e.g., soil, vegetation growth, seasons, etc.).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A data collecting system comprising:
at least one tag device comprising a battery, a memory, a transceiver, a controller, and at least one sensor, the tag device being adapted for:
generating and transmitting a beacon signal;
storing the data in memory when no reception signal is received within a first time lapse; and
entering an idle mode for a second time lapse during which the at least one tag device is unable to detect signals;
and
a bridge device comprising a controller and a transceiver, the bridge device being adapted for:
receiving, tether-free from the at least one tag device, the beacon signal; and
transmitting the reception signal in response to the beacon signal.

2. The data collection system of claim 1, wherein the beacon signal comprises data relative to a reading performed by the at least one sensor.

3. The data collection system of claim 1, wherein the at least one tag device is adapted to operate in a low-power mode during the second time lapse, and in at least one active mode consuming more power than the low-power mode, wherein the at least one tag is adapted to exit the low-power mode at the first intervals for the at least one sensor to perform a reading.

4. The data collection system of claim 3, wherein the at least one active mode comprises a data transmission mode, a data reception mode and a memory updating mode.

5. The data collection system of claim 1, wherein the at least one tag device is adapted for transmitting a follow-up signal comprising asynchronous data upon reception of a reception signal.

6. The data collection system of claim 5, wherein the at least one tag device is adapted to receive a reception signal following transmitting the follow-up signal within a second time lapse, and to optionally erase the asynchronous data from the memory.

7. The data collection system of claim 3, wherein power ratio of the at least one active mode over the low-power mode is at least 50:1.

8. The data collection system of claim 1, wherein the transceiver of the at least one tag device is adapted for exchanging signals of a wavelength of less than 1 GHz.

9. The data collection system of claim 1, wherein the transceiver of the at least one tag is adapted for exchanging signals using one selected wavelength among a plurality of wavelengths.

10. The data collection system of claim 1, wherein a ratio of the second time lapse over the first time lapse is at least 50:1.

11. The data collection system of claim 9, wherein a ratio of the second time lapse over the first time lapse is at least 300:1.

12. The data collection system of claim 1, wherein the at least one sensor is an underground sensor.

13. The data collection system of claim 1, wherein the at least one sensor is a ground interface sensor.

14. The data collection system of claim 1, wherein the at least one sensor is a surface sensor.

15. The data collection system of claim 1, wherein the at least one tag device comprises a first tag device and a second tag device transmitting beacon signals independently from each other.

16. The data collection system of claim 15, wherein the first tag device operates according to a first set of parameters, and the second tag device operates according to a second set of parameters, and the first set of parameters is not identical to the second set of parameters.

17. A data collection and analytic system, comprising the data collection system of claim 1, and at least one aggregator adapted for receiving the data and to validate, analyze and/or modify the data.

18. A method of operating a tag device of a data collecting system, the tag device comprising a memory and at least one sensor, the method comprising:
generating and transmitting a beacon signal, the beacon signal comprising data relative to a reading performed by the at least one sensor;
upon no reception signal is received within a first time lapse following transmitting the beacon signal, storing the data in memory;
entering an idle mode for a second time lapse during which the at least one tag device is unable to detect signals; and
transmitting a follow-up signal comprising asynchronous data upon reception of a reception signal.

19. The method of claim 18, further comprising to receive a reception signal following the transmission of the follow-up signal within a second time lapse, and to optionally erase the asynchronous data from the memory.

20. The method of claim 18, comprising setting a ratio of the second time lapse over the first time lapse to at least 50:1.

* * * * *